No. 11,679. Reissued July 19, 1898.

W. B. HOLTON.

KEYLESS LOCK.

(Application filed May 21, 1898.)

Witnesses
J. G. Hinkel
Paul D. Strong

Inventor
Winfred B. Holton,
by Foster & Freeman
Attorneys

THE NORRIS PETERS CO., PHOTO-LITHO., WASHINGTON, D. C.

UNITED STATES PATENT OFFICE.

WINFRED B. HOLTON, OF INDIANAPOLIS, INDIANA, ASSIGNOR TO THE KEYLESS LOCK COMPANY, OF SAME PLACE.

KEYLESS LOCK.

SPECIFICATION forming part of Reissued Letters Patent No. 11,679, dated July 19, 1898.

Original No. 597,080, dated January 11, 1898. Application for reissue filed May 21, 1898. Serial No. 681,392.

*To all whom it may concern:*

Be it known that I, WINFRED B. HOLTON, a citizen of the United States, residing at Indianapolis, in the county of Marion and State of Indiana, have invented certain new and useful Improvements in Keyless Locks, of which the following is a specification.

My invention relates to permutation or combination locks, and while it is applicable to locks of various kinds it is designed more especially for such locks as are adapted to be applied to lock-boxes, drawers, desks, and similar articles.

My present invention has for its object to provide a self-locking combination or permutation lock—that is, a lock of the general character described which will automatically lock itself after it has been operated to open the box, drawer, or other article to which it is connected, so that it cannot be surreptitiously opened by unauthorized persons; and to these ends my invention consists in the features of construction and arrangement, substantially as hereinafter more fully set forth.

Figure 1:
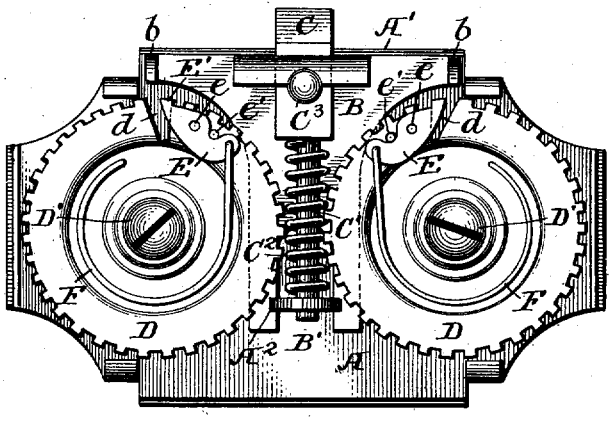
Figure 2:
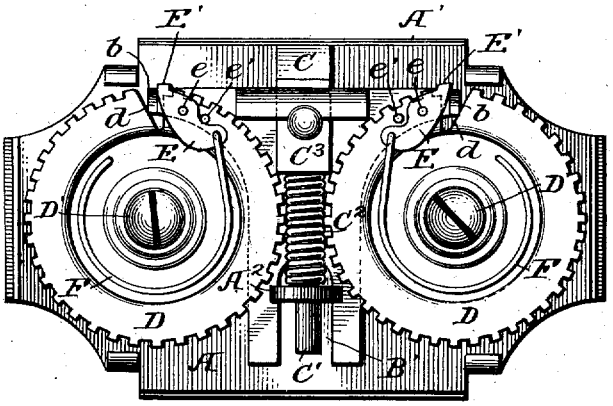
Figure 3:
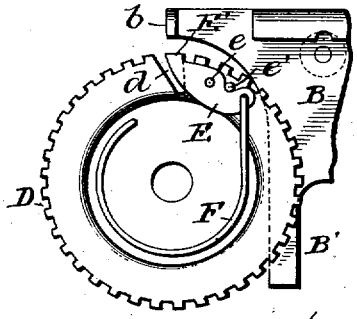

In the accompanying drawings, Figure 1 is a side view of the operating mechanism of a lock of this general character sufficient to illustrate my invention. Fig. 2 is a similar view showing the bolt in its unlocked position, and Fig 3 is a similar detail view showing another position of the parts.

As my invention is adapted to be applied to various constructions of permutation or combination locks I have not deemed it necessary to show the details of construction further than is desirable in illustrating the construction and operation of my improvements, as this will be sufficient to enable those skilled in the art to make and use my invention and apply it to different forms of locks.

In the drawings, A represents a lock-plate of a well-known style of lock of this general character, the inclosing plate or case being removed for clearness. On the face of the lock-plate are arranged some sort of dials or indicating devices by which the tumbler or tumblers of the lock can be manipulated, and means are also arranged, as usual, for moving the latch, none of which are shown herein, as they are independent of my present invention.

Mounted on the lock-plate A is a latch-plate B, which is of a well-known construction and is arranged to slide on the lock-plate, being guided in the present instance by its upper end passing through an opening in the upturned portion A′ of the lock-plate and its rear portion being slotted at B′ to embrace a stud $A^2$, secured to the lock-plate. Any other well-known or desirable form of lock-plate can be used, of course, and in the present instance I have shown it as provided with two dogs or fingers adapted to coöperate with the tumblers or wheels in the manner hereinafter set forth.

Mounted to move with the lock-plate is a latch C, its upper end passing through a slot in the lock-plate and its stem portion C′ passing through an opening in the stud $A^2$, and a spring $C^2$ surrounds the stem and tends to project the latch. There is a knob $C^3$, connected to the latch, which permits its operation from the inside, and of course there is some means (not shown) for moving the latch from the outside when the lock is set at the proper combination. It will be understood that from the inside the latch can be moved without moving the latch-plate, but from the outside the latch can only be moved by first moving the latch-plate, which plate is controlled in its movements by the tumblers or wheels.

Mounted on the lock-plate are the tumbler or tumblers or wheels D D, two being shown in the present instance, and these are secured on pivots D′ in any suitable and well-known manner, so that they can be turned in connection with any dial or other indicating device on the outside of the lock at any desired or prearranged position. The peripheries of the tumblers may be notched, as shown in the drawings, or otherwise arranged, and at some point they are provided with a slot *d*. Usually this has been arranged as a radial slot, so that when the tumblers are under the dogs or fingers *b* on the latch-plate upon the movement of the latter the dogs will pass into the slots directly, and on releasing the latch or latch-plate they will move out again into their normal position. It will be understood that with this construction if the operator of the lock should go away, leaving the tumblers in a position to allow the lock to be operated, unauthorized persons could manipulate it, and it is to provide against such inadvertence or accident on the part of the operator that my present invention is made, and I do this by providing automatic devices which will move the tumblers into the locking position when the latch or latch-plate is released.

In the present instance the slots *d* are made with an inclined or beveled side, so that this side does not extend radially into the body of the tumbler. In this way when the tumblers are arranged in unlocking position and the latch-plate is operated the dogs entering the slots tend to rotate the tumblers a short distance out of the normal or unlocked position. Arranged on the tumbler or tumblers adjacent to the slots is a stop or trip E, which may be of any desired shape and in the present instance is pivoted to the tumbler at *e* and is normally held against the stop-pin *e'* by a spring F, also secured to the tumbler. The free end E' of the trip normally extends part way over the slots *d*, as shown in Fig. 1, permitting the dogs or fingers *b* to enter the slots of the tumblers. As the dogs are pressed downward they come in contact with the inclined side of the slots *d*, rotating the tumblers, and the stop or trip E yields under the operation of the dogs, so that it assumes a position substantially as shown in Fig. 2. When the latch is released and is projected to its normal position, the trip E, under the force of the spring F, assumes its normal position and comes under the dogs or fingers *b*, as shown in Fig. 3, so that any attempt to operate the lock by unauthorized persons would result in the dog or dogs *b* impinging upon the end E' of the trip or stop E, preventing the dogs entering the slots *d*, and consequently the operation of the lock. Of course it will be understood that an authorized person can move the tumblers so as to bring the open portion of the slots again in proper position; but an uninitiated or unauthorized person would not know how to move the tumblers to permit the operation of the lock.

From this description the general construction and arrangement of the parts of my invention will be clearly understood, as well as its mode of operation, and it will be seen that by the use of an exceedingly simple and inexpensive structure I provide an effective automatic self-locking combination-lock which is not liable to get out of order and which adds largely to the safety of the lock and renders its unauthorized operation more difficult.

What I claim is—

1. In a permutation or combination lock, a tumbler provided with a slot having an inclined face, a dog adapted to enter the slot and make contact with the inclined face thereof, and means for preventing the reentrance of the dog when the tumbler has been moved, substantially as described.

2. In a permutation or combination lock, a tumbler provided with a slot, a dog adapted to enter the slot of the tumbler, and a trip arranged on the tumbler adjacent to the slot and adapted to prevent the reëntrance of the dog, substantially as described.

3. In a permutation or combination lock, the combination of a tumbler provided with a slot having an inclined side, a pivoted trip on the tumbler, and a dog adapted to engage the inclined side or the trip according to the position of the tumbler, substantially as described.

4. In a permutation or combination lock, the combination of a tumbler provided with a slot, a spring-actuated trip arranged on the tumbler adjacent to the slot, and a dog adapted to engage the slot or the trip according to the position of the tumbler, substantially as described.

5. In a permutation or combination lock, the combination with the latch and dog, of a tumbler having a slot provided with an inclined side, and a pivoted trip arranged adjacent to the slot, whereby when the dog is operated the tumbler is partially rotated and when the dog is released the trip automatically moves into position to prevent its entering the slot, substantially as described.

In testimony whereof I have signed my name to this specification in the presence of two subscribing witnesses.

WINFRED B. HOLTON.

Witnesses:
J. M. JOHNSON,
N. G. NOWLAND.